US 6,596,218 B2

(12) United States Patent
Klotz

(10) Patent No.: US 6,596,218 B2
(45) Date of Patent: Jul. 22, 2003

(54) METHOD OF PRODUCING COATED MOLDED PLASTIC ARTICLES, AND INJECTION MOLD

(75) Inventor: Bernd Klotz, Günding (DE)

(73) Assignee: Krauss-Maffei Kunststofftechnik GmbH, München (DE)

(*) Notice: Subject to any disclaimer, the term of this patent is extended or adjusted under 35 U.S.C. 154(b) by 0 days.

(21) Appl. No.: 09/809,935

(22) Filed: Mar. 16, 2001

(65) Prior Publication Data
US 2001/0010412 A1 Aug. 2, 2001

Related U.S. Application Data

(63) Continuation of application No. PCT/EP99/06974, filed on Sep. 21, 1999.

(30) Foreign Application Priority Data

Sep. 24, 1998 (DE) .......................................... 198 43 921

(51) Int. Cl.[7] .................................................. B29C 45/14
(52) U.S. Cl. ....................... 264/511; 264/255; 264/266; 264/328.7; 264/510
(58) Field of Search ........................... 264/328.7, 46.4, 264/510, 511, 259, 266, 255; 425/112, 145, 150

(56) References Cited

U.S. PATENT DOCUMENTS

| 4,075,266 A | * | 2/1978 | Theysohn ................ 264/328.7 |
| 4,216,184 A | * | 8/1980 | Thomas ...................... 264/266 |
| 5,401,457 A | * | 3/1995 | Valyi ......................... 264/266 |
| 5,543,094 A | * | 8/1996 | Hara et al. .................. 264/259 |
| 5,795,526 A | * | 8/1998 | Matsumoto et al. ....... 264/328.7 |
| 5,843,555 A | * | 12/1998 | Atake et al. ................ 264/511 |
| 5,925,302 A | * | 7/1999 | Oono et al. ................. 264/511 |
| 6,045,738 A | * | 4/2000 | Atake ......................... 264/511 |
| 6,071,456 A | * | 6/2000 | Hanamoto et al. .......... 264/511 |
| 6,174,488 B1 | * | 1/2001 | Usui et al. .................. 264/511 |
| 6,331,263 B1 | * | 12/2001 | Abe et al. ................... 264/40.5 |

FOREIGN PATENT DOCUMENTS

| DE | OS-25 48 318 | | 5/1977 | |
| DE | 43 13 951 C2 | | 11/1993 | |
| DE | 44 25 342 A1 | | 1/1995 | |
| DE | 195 22 561 C2 | | 2/1996 | |
| DE | 44 45 798 C1 | | 7/1996 | |
| DE | 195 31 143 C2 | | 2/1997 | |
| DE | 195 31 143 A | | 2/1997 | |
| DE | 195 81 043 C2 | | 10/1998 | |
| EP | 0 035 916 | * | 9/1981 | .............. 264/328.7 |
| EP | 0 333 198 B1 | | 9/1989 | |
| EP | 0 446 941 A | | 9/1991 | |
| EP | 0 477 967 A | | 4/1992 | |
| EP | 08 22 048 A1 | | 4/1998 | |

(List continued on next page.)

OTHER PUBLICATIONS

Brown, A.B. Wenninger BP.: Forming a Composite Molded Part. In. IBM Technical Disclosure Bulletin, vol. 17, No. 8, Jan. 1975, p. 2216, p. 2217.

Primary Examiner—Allan R. Kuhns
(74) Attorney, Agent, or Firm—Henry M. Feiereisen

(57) ABSTRACT

A method of producing a composite plastic molded article having at least one layer of web material and a plastic body, includes placement of the web material between mold halves of an injection mold and deforming the web material through closing of the mold. Subsequently, negative pressure is applied on one side of the web material and/or excess pressure is applied on its other side, so that the web material bears upon a mold half. Plastic mass is then introduced into the opening mold in such a way that the feed rate of the plastic mass and the opening speed of the injection mold are coordinated with each other. Once a certain opening gap has been reached, the mold is closed and the plastic article is embossed.

20 Claims, 6 Drawing Sheets

FOREIGN PATENT DOCUMENTS

| | | | | |
|---|---|---|---|---|
| EP | 08 39 625 A2 | 5/1998 | | |
| FR | 2 329 434 A | 5/1977 | | |
| GB | 2 138 737 A | 10/1984 | | |
| JP | 55-118849 | * | 9/1980 | 264/328.7 |
| JP | 60-97816 | * | 5/1985 | 264/511 |
| JP | 61-14922 | * | 1/1986 | 264/511 |
| JP | 1-263013 | * | 10/1989 | 264/511 |
| JP | 4-74613 | * | 3/1992 | 264/511 |
| JP | 5-42560 | | 6/1993 | |
| JP | 06 126773 A | | 5/1994 | |
| JP | 60 110419 A | | 6/1995 | |
| JP | 08118409 A | | 5/1996 | |

* cited by examiner

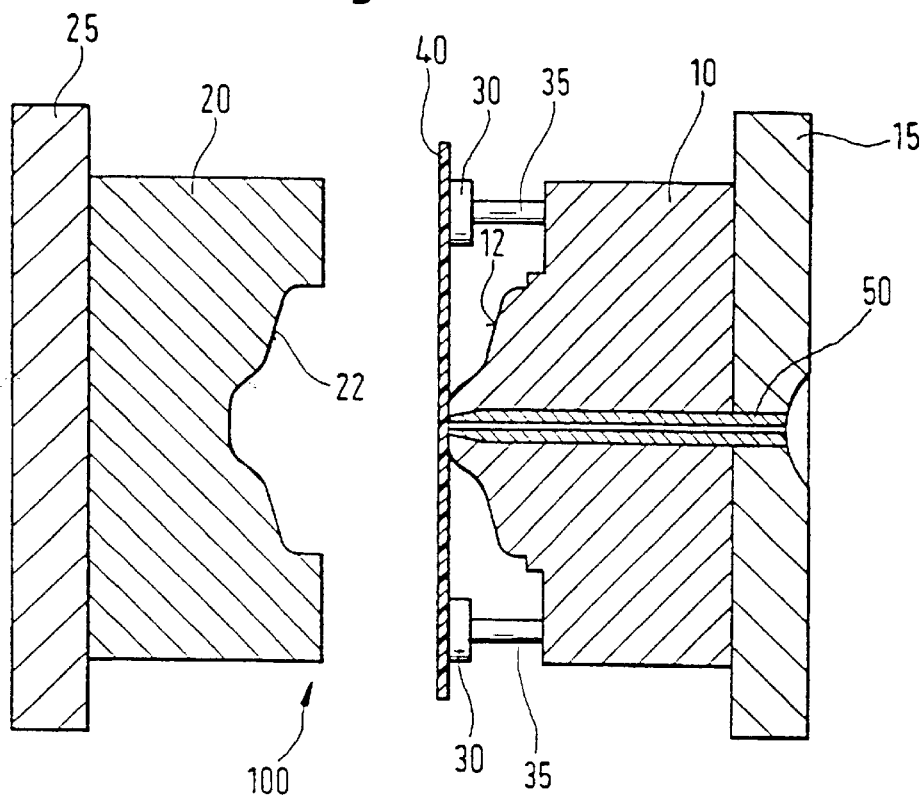
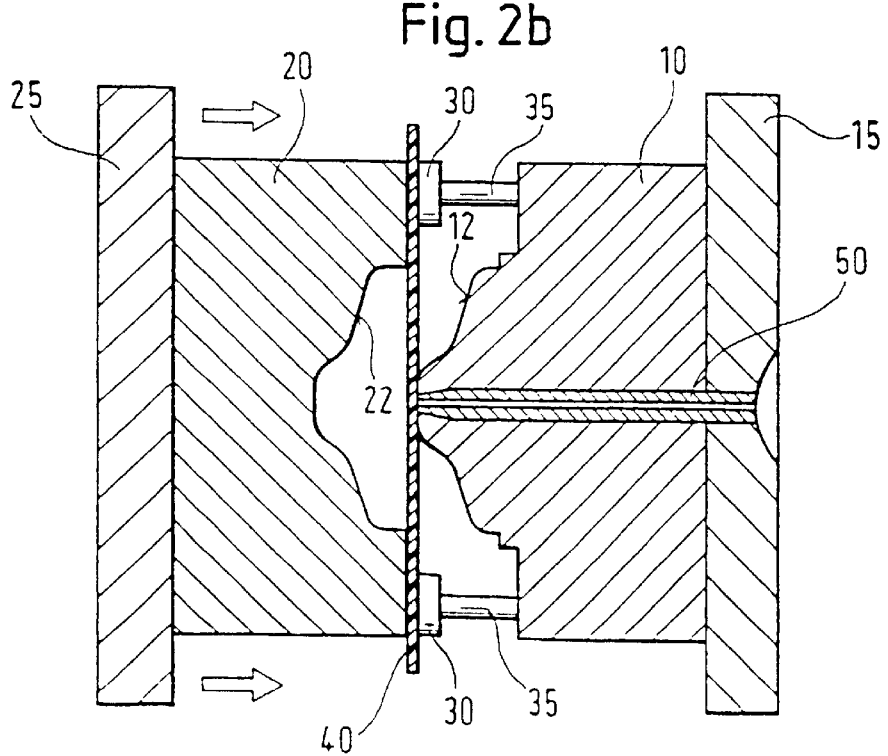

METHOD OF PRODUCING COATED MOLDED PLASTIC ARTICLES, AND INJECTION MOLD

CROSS-REFERENCES TO RELATED APPLICATIONS

This application is a continuation of prior filed copending PCT International application no. PCT/EP99/06974, filed Sep. 21, 1999.

This application claims the priority of German Patent Application Serial No. 198 43 921.0, filed Sep. 24, 1998, the subject matter of which is incorporated herein by reference.

BACKGROUND OF THE INVENTION

The present invention relates to a method and apparatus for producing composite plastic molded articles having at least one layer of web material (sheets, laminates, fabrics, generally flat materials) and a plastic body, with the composite plastic molded articles being made by injection molding.

Such molded plastic articles are currently used, for example, for articles of furniture, household appliances etc. and in the automobile industry for lining the inside of doors, dashboards, trunk linings, visors etc. The coated areas of the molded plastic articles form hereby the visible surfaces, when mounted, and, for esthetic reasons, carry decors and/or have particular surface characteristics, such as color design, surface texture or tactile properties, such as, for example, "soft-touch", i.e. a certain surface resiliency, oftentimes realized by foamed plastic materials. In the following description, coated materials of this type, including sheets, foamed plastics, decorative materials etc. are denoted in general as web materials. Such web materials react oftentimes very sensitive to deformations and heat so that in an injection molding tool embossment paths of up to 150 mm have been used during back injection of web materials in order to reduce the stress on the web material.

For example, EP-0333198 B1 describes a so-called "vertical machine", having an injection mold with mold halves traveling in vertical position for making a composite molded plastic article. Web material is placed on one mold half of the open injection mold, and subsequently the mold is closed, with plastified plastic mass being introduced into the mold during the closing operation. In this way, damage to the web material is supposed to be prevented, when the plastic mass is introduced.

DE-19531143 C2 proposes a different path while also relating to a vertical machine for injection molding molded plastic articles. Web material is placed into the open injection mold, the mold is closed again, thereby deforming the web material, and plastified plastic mass is introduced during the subsequent opening operation into the opening mold. After introduction of the plastified plastic mass, the mold is closed and the plastic mass is formed through pressing within the mold cavity.

A so-called horizontal machine, in which the mold halves move in horizontal direction is known from DE-OS-2548318. Heated web material is placed between the mold halves and negative pressure is applied on one of the mold halves so that the web material rests upon the inner wall surface of the mold half. After closing the mold, except for a remaining gap, plastified plastic mass is injected into the thus slightly enlarged cavity. Finally, the mold is completely closed to allow the plastic mass to spread in the mold cavity.

Conventional wisdom assumed that greater embossment paths cannot be realized in a horizontal machine because the injected plastic mass cake flows downwardly as a consequence of gravitation and thus will not spread in a desired manner.

It would therefore be desirable and advantageous to provide an improved method for producing composite plastic molded articles, to obviate prior art shortcomings and to realize great embossment paths and yet being applicable in vertical machines as well as horizontal machines.

SUMMARY OF THE INVENTION

According to one aspect of the present invention, a web material is first placed between the mold halves of an open injection mold, the mold is closed as the web material deforms, negative pressure is applied on one side of the web material and/or excess pressure is applied on the other side of the web material, so that the web material bears snugly against one mold half, plastified plastic mass is introduced in controlled amounts into the mold cavity of the injection mold, as opening of the injection mold is carried out in a controlled fashion until reaching a predetermined position, the injection mold is fully closed, and subsequently, the finished molded plastic article is withdrawn from the mold.

To support pre-forming, the web material may be heated either across the entire area or locally, before placement into the mold or shortly before closing of the mold halves.

The above-referred notion that great embossment paths cannot be realized in horizontal machines or in vertical machines, when the mold flanks are very steep, is based on the thinking that the plastic mass is quenched on the mold wall during injection molding of the plastic mass so as to form a "cold skin" which does not adhere to the mold wall surface and thus slides off the steep mold wall surfaces.

In contrast thereto, the invention is based on the surprising recognition that through injection of plastic mass, the so-called mass cake, to the back of web materials does not result in a formation of a cold skin, but rather results in an adhesion of the plastic mass to the web material, thereby preventing a falling off of the plastic mass. In conjunction with the controlled opening speed of the mold and the respective introduction of the plastic mass at a controlled feed rate, very large mold gaps can be realized in accordance with the invention, even when the mold flanks are very steep or in horizontal machines are involved.

According to another feature of the present invention, the feed rate of the plastic mass and opening and closing movements of the injection mold are so selected in dependence on one another and on the shape of the molded plastic article that the pressure of the plastic mass on the web material is substantially minimized and the plastic mass migrates essentially radially with respect to the point of injection and a swell flow is maintained across the entire injection process.

The point of injection of the plastic mass is implemented via a sprue channel or several sprue channels, depending on the configuration of the molded plastic article.

To further support the swell flow, further plastic mass may be fed during closing of the mold halves.

BRIEF DESCRIPTION OF THE DRAWINGS

Other features and advantages of the present invention will be more readily apparent upon reading the following description of a preferred exemplified embodiment of the invention with reference to the accompanying drawing, in which:

FIGS. 2a to 2h show various process phases of the injection molding process according to the present invention.

DETAILED DESCRIPTION OF PREFERRED EMBODIMENTS

Figure 1:
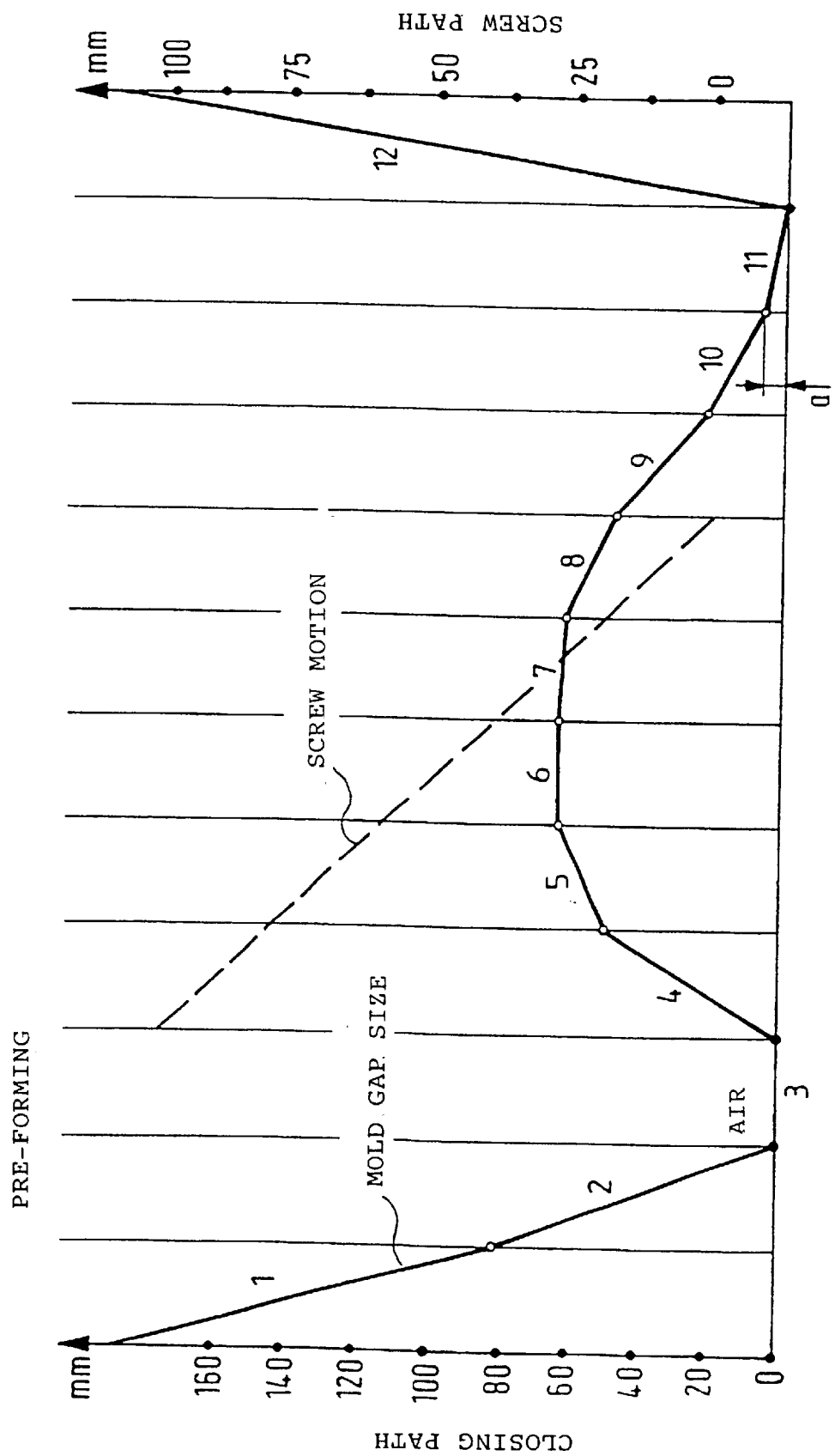
FIG. 1 shows a flow chart of making an composite plastic molded article in accordance with the present invention.

Throughout all the Figures, same or corresponding elements are generally indicated by same reference numerals.

Turning now to the drawing, and in particular to FIG. 1, there is shown a flow chart illustrating in schematic illustration a cycle of the injection molding process according to the invention with reference to a graph which plots the closing path of the mold halves of an injection mold, i.e. the size of the mold gap (left ordinate) against the time (abcissa) in a continuous line, and the screw path (right ordinate) against the time in a broken line. The individual phases of the injection molding process are designated by numerals 1 to 12 and will be described in detail hereinafter.

In a phase zero (not represented in FIG. 1), a suitable web material (decorative material, foamed plastic material etc.) is cut to size and heated across the entire area or only in predetermined section to provide the web material with an elasticity commensurate with the molded article and to suit it to the process. The thus received web material is then placed between the mold halves of the injection mold.

In the phases 1 and 2, the mold 100 is subsequently closed, and a pressure source 16 applies negative pressure on one side of the web material 40 and/or excess pressure on the other side of the web material 40 to conclude the pre-forming stage of the web material at the end of the phase 3. In the phases 4 to 7, the mold 100 is opened again, while plastic mass is fed at the same time. The closing movement of the mold begins in phase 8 and is maintained until the end of the phase 11, whereby plastic mass is continuously being fed also during the phase 8. After the mold is completely closed and after a possible cool-down period (not shown), the mold is opened again in phase 12, the molded plastic article is removed, and a new cycle starts.

Referring now to FIGS. 2a to 2h, there are shown illustrations of the injection mold in various process phases of the injection molding process according to the present invention. The injection mold is, generally designated by reference numeral 100, is of the horizontal machine type and includes a mold half (male mold) 10 and a mold half (female mold) 20. As is generally known and therefore not described in detail, one of the mold halves, here the mold half 20, is stationary and mounted onto a stationary support 25 and has an inner mold surface 22, and the other one of the mold halves, here mold half 10, is able to travel in horizontal direction toward the mold half 20. The mold half 10 is hereby mounted onto a moving support 15 and has a sprue channel 50 for supply of plastic mass. Of course, the mold half 10 may have more than one such sprue channel 50 if desired. However, the following description refers to only one sprue channel 50 for sake of simplicity. The sprue channel 50 terminates at an inner mold surface 12 of the mold half 10. When the injection mold 100 is closed, the inner mold surfaces 12 and 22 form the cavity for formation of the molded plastic article.

As shown in FIG. 2a, a web material 40 which has been cut to size and heated, for example with an infrared radiator, is placed, for example by means of a, not shown, gripping robot, onto a clamping frame 30 on the mold half 10 of the open mold 100 and held in place on the clamping frame 30 by, not shown, conventional means, such as clamping elements, gripping elements or negative pressure. If desired, the infrared radiator may also be held in position there. This concludes the above-stated process step 0.

In the subsequent process step 1, as shown in FIG. 2b, the mold 100 is closed until the clamping frame 30 presses the web material 40 against a contact surface of the confronting mold half 20.

Figure 2C:
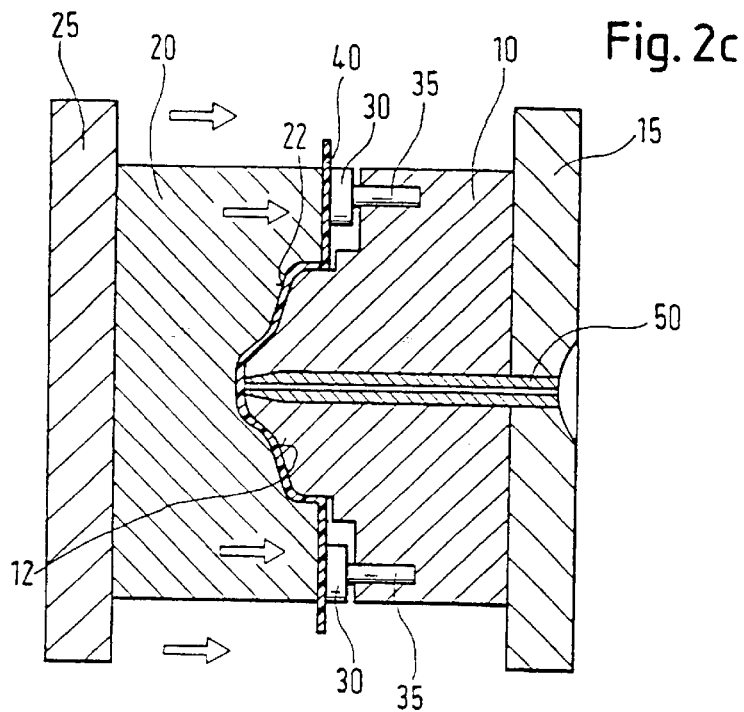
Figure 2D:
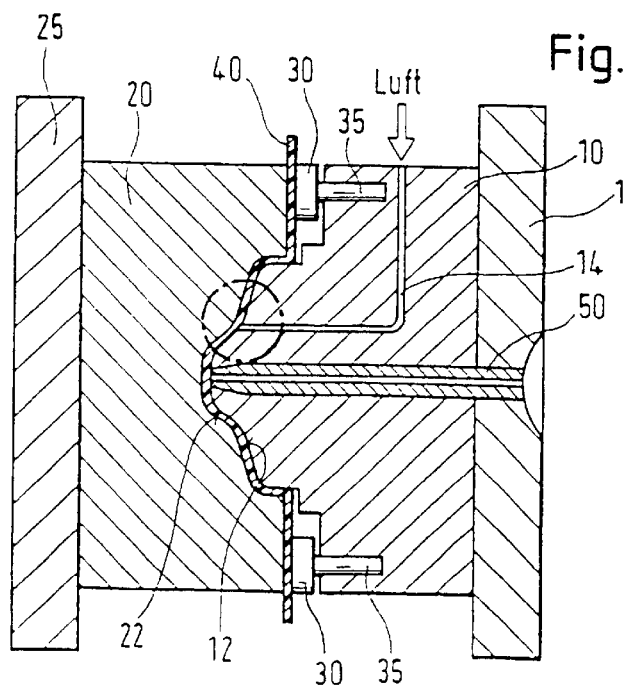

Next, as shown in FIG. 2c, the mold half 10 is further advanced, thereby realizing a mechanical pre-forming of the web material 40 between the opposing mold surfaces 12, 22 of the mold halves 10, 20 until the mold 100 is fully closed. Support elements 35 of the clamping frame 30 can hereby retract into the mold half 10 to such an extent commensurate with the required closing path. As the coamping frame 30 bears on the contact surface of the mold half 20, wrinkle formation of the web material 49 is prevented.

Figure 2E:
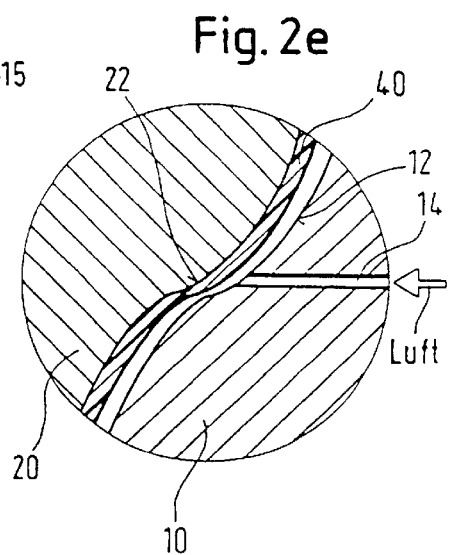

When the mold 100 is fully closed, the web material 40 does not fully fill out the cavity of the mold as plastic mass is yet to be introduced at a later stage. Therefore, a pneumatic pre-forming is carried out in the above-stated process step 3. During the closing operation (up to 2) or when the mold 100 is fully closed (up to 3), excess pressure is applied via one or more air channels 14 from one side and/or negative pressure is applied via vacuum nozzles (not shown) from the other side, in order to support the preform operation, thereby allowing the web material 40 (depending on the requirements) to be pressed completely upon the inner mold surface 22 of the cavity. This is shown in particular in FIG. 2d. FIG. 2e shows by way of an enlarged scale the remaining free space available for subsequent introduction of plastic mass. The permanent deformation of the web material 40 is set by the time period of the process steps 2 to 3. In case an elastic deformation is required only, the time period of the process steps 2 to 3 may be reduced to a minimum.

Figure 2F:
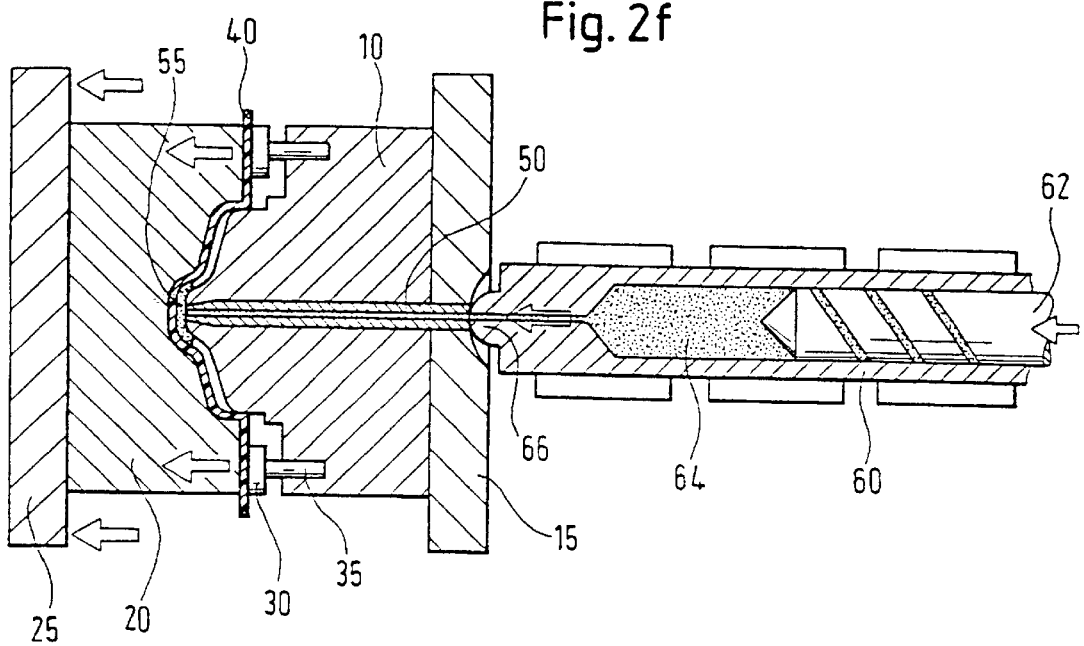

Following the process steps 2 to 3 are the process steps 4 to 7 according to the flow chart of FIG. 1, during which plastic mass is introduced into the opening mold 100. This is schematically illustrated in FIG. 2f, which shows additionally the provision of an extruder 60 with an extruder screw 62 in which the plastic material is plastified and accumulated in a collecting space 64, and subsequently injected via a nozzle 66 into the sprue channel or sprue channels 50 of the mold half 10. Commencement of the process step 4 initiates the injection process of the plastic mass while the injection mold 100 is opened by a predetermined distance (up to process step 5), employing a control unit 18 containing a suitable program to freely set the opening speed of the moving mold half 10. The plastic mass is injected through one or more injection points in controlled amounts via the sprue channel(s) 50, so that one or more mass cakes are formed. The size of the mass cakes is defined by the opening period of the injection points. Metering of the mass is suited to the molded article. This process is implemented because the incoming mass cake must be held early enough by the adhesive effect on the web material, and the pressure load on the web material as a consequence of the opening movement should be minimized.

The different ascents of the graph of the closing path in FIG. 1 in steps 4, 5, 6 and 7 indicate that the speed of the mold opening varies, though the feed rate of the plastic mass remains constant, as indicated in FIG. 1 by broken line, representing the constant ascent of the graph of the screw path. This means, the mold opening speed is relatively great in the phase 4, decreases in the phase 5 and is zero in the phases 6 and 7. This is based on the availability of a steadily increasing cavity in flat workpieces for the expanding plastic cake with increasing radius from the injection point.

This process control ensures that the plastic mass adheres to the web material 40, on the one hand, and to the mold half 10, on the other hand, and expands to all sides radially with respect to the injection point so that a falling off of the plastic cake is prevented and swell flow is maintained.

Of course, it is also possible to keep constant the mold opening speed and to accordingly control the injection rate through the sprue channel 50, or to change both parameters together. Metering should hereby carried out in such a manner that the plastic mass spreads out essentially radially with respect to the injection point. In practice, further parameters enter into the control/adjustment of a machine, for example, viscosity of the plastic mass, concrete shape of the cavity etc. Suitable values for the various, mutually dependent parameters are, therefore, determined during the break-in phase of a machine through test runs and/or calculations.

Figure 2G:
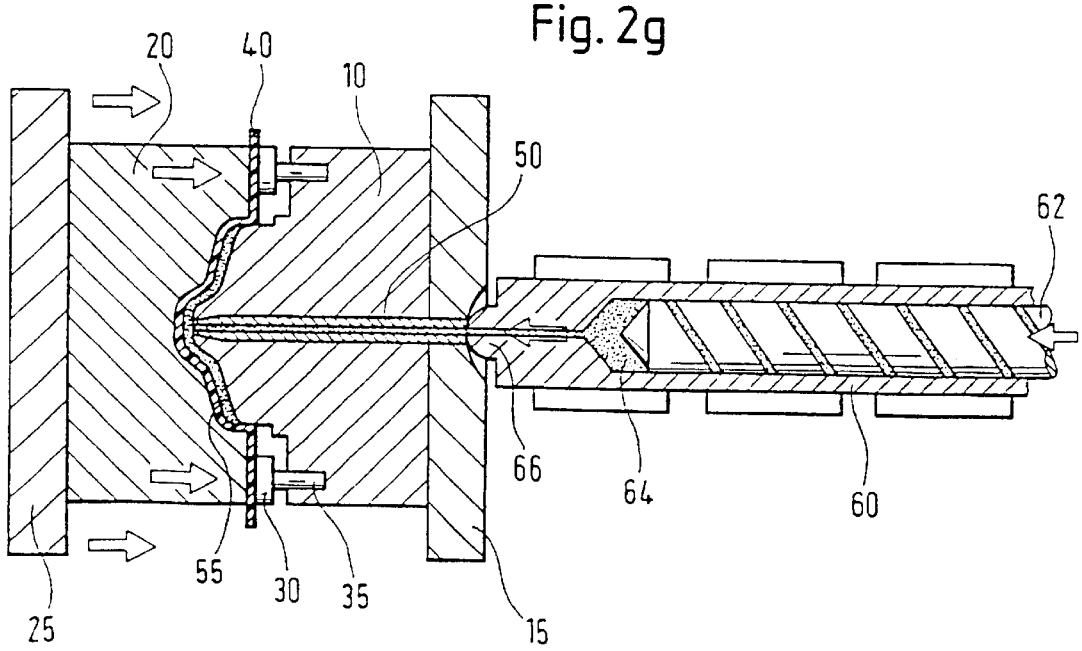

In process step 8 of FIG. 1, plastic mass is injected into the closing mold 100. This means, embossment of the mass cake(s) with defined embossing speeds and embossing pressure commences already during injection of the plastic mass. In this way, the flow fronts in the cavity are kept continuously in motion with the objective of establishing a speed of the flow fronts as constant as possible. FIG. 2g shows the state of the tool at the end of the process step 8.

Figure 2H:
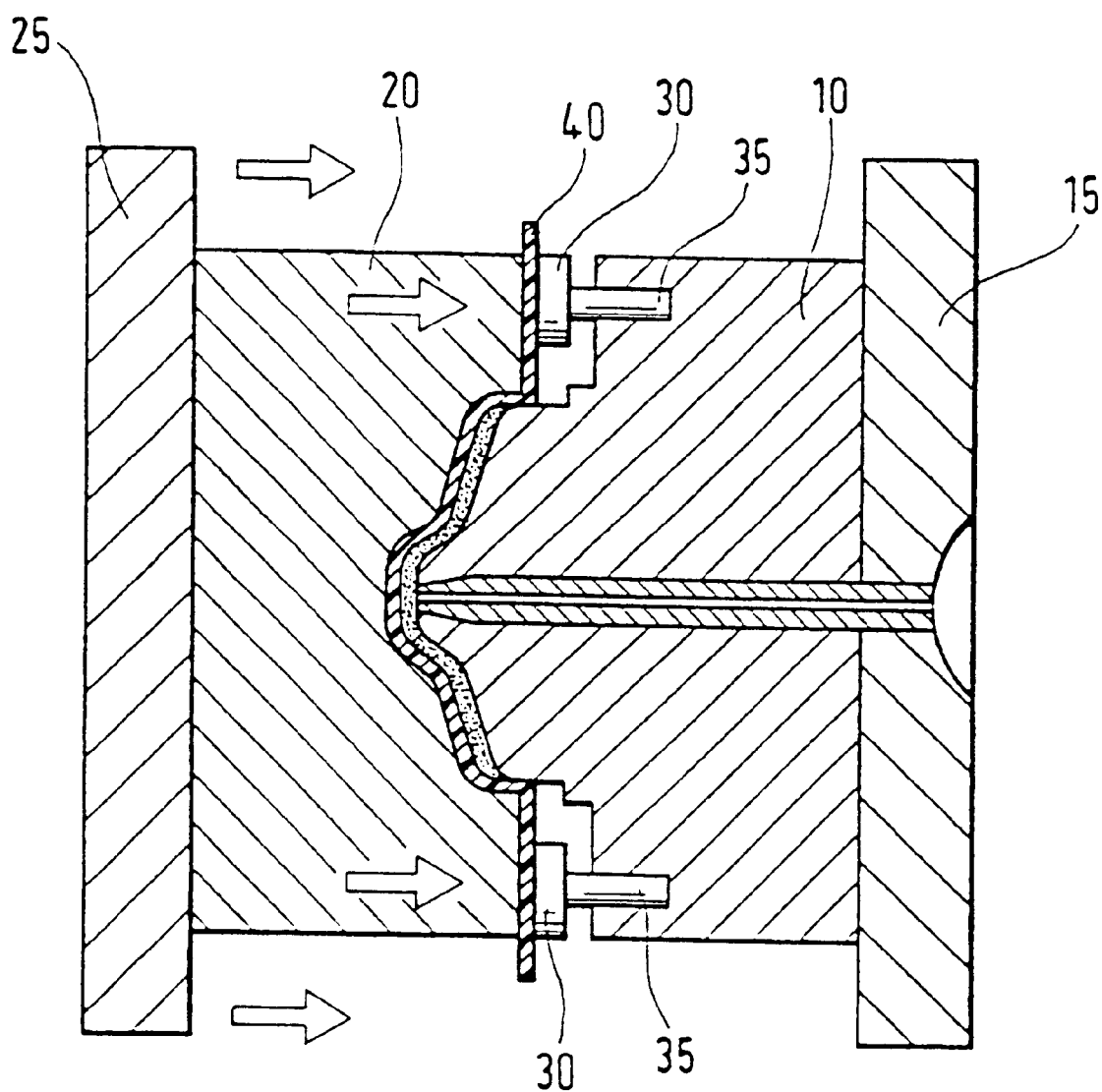
Figure 3:
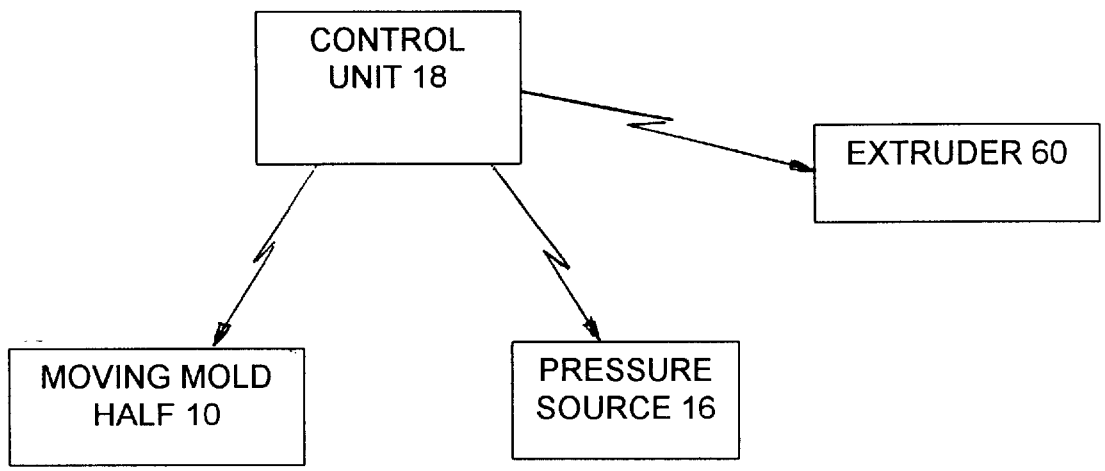
FIG. 3 is a block diagram showing the relationship of components of the injection mold.

In the process steps 9 and 10, a mold embossing operation is executed as the mold 100 is further closed until the cavity is completely filled, as shown schematically in FIG. 2h, whereby a residual opening gap a (cf. FIG. 1) remains.

Elimination of shrinkage is carried out in process step 11. By means of the further acting embossing force and the remaining residual opening gap a, material shrinkage is equalized. Towards the end of process step 11, the mold 100 is almost or just about closed and can be opened (cf. FIG. 2h), optionally after a cool-down period.

Finally, the mold 100 is opened again in process step 12, the formed molded plastic article is removed, a new web material 40 can be introduced, and the cycle begins anew.

The method according to the invention realizes cycle times of about 60 sec., whereby the plastic mass has, for example, a temperature of about 200° C. and the web material may be heated to a temperature of, for example, 40° C. Through this heating, the web material can be better shaped and thus conform better to the contours of the inner mold surface. This does not necessarily mean that a deep drawing process is involved here, in which the web material is solidified directly after being pressed against the inner mold half and remains in this mold. Depending on the case of application, the web material may be heated to other temperatures in the range of 40° C. to 60° C. up to, for example, 200° C., so that in an extreme case the web material is subject to plastic deformation in step 3.

As already set forth above, the method according to the invention is advantageous in particular for thermally insulated web materials, for example, for foamed plastics. It is also not necessary that the web material is a single-layer material. Also, composite material of several layers may be used as web material. Hereby, it is conceivable that the web material may have a decorative layer combined with another layer such as a thermally insulated layer to thereby improve the inventive effect.

The chart of FIG. 1 shows by way of example closing paths of up to more than 160 mm. Depending on the used materials, other closing paths, greater (up to above 200 mm) or smaller, may, however, also be used.

While the invention has been illustrated and described as embodied in a method of producing coated molded plastic articles, and injection mold, it is not intended to be limited to the details shown since various modifications and structural changes may be made without departing in any way from the spirit of the present invention.

What is claimed as new and desired to be protected by Letters Patent is set forth in the appended claims.

What is claimed is:

1. A method of producing a composite molded plastic article having at least one layer of a web material and a layer of a plastic mass, comprising the steps of:
   a) placing a thermally insulated web material between confronting mold halves of an injection mold;
   b) closing the injection, mold, thereby deforming the web material;
   c) applying at least one pressure selected from the group consisting of negative pressure on one side of the web material and positive pressure on the other side of the web material;
   d) introducing plastified plastic mass at a feed rate via an injection point into a cavity of the injection mold and simultaneously opening the injection mold at an opening speed until reaching a predetermined position, whereby the feed rate of the plastic mass and the opening speed of the injection mold are coordinated with one another;
   e) maintaining a fixed opening gap between the confronting mold halves of the injection mold and continuing to feed plastic mass into the mold cavity;
   f) closing of the injection mold to form a finished plastic article; and
   g) removing the plastic article.

2. The method of claim 1, wherein the feed rate and the opening speed are so coordinated with one another that the plastic mass expands in the mold cavity in one of an essentially circular manner and radially to all sides about the injection point.

3. The method of claim 1, wherein at least during commencement of the closing operation in step f) plastic mass is continued to be introduced into the mold cavity.

4. The method of claim 1, and further comprising the step of heating at least predetermined areas of the web material before or after step a).

5. The method of claim 4, wherein the web material is heated across its entire area before or after step a).

6. The method of claim 1, wherein the plastic mass is introduced through at least one sprue channel to define the injection point.

7. The method of claim 6, wherein the feed rate of the plastic mass and opening and closing movements of the injection mold are so selected in dependence from one another and from the shape of the plastic article that a swell flow is maintained.

8. The method of claim 1, wherein the web material includes foamed plastic.

9. The method of claim 1, wherein the feed rate of the plastic mass and opening and closing movements of the injection mold are so selected in dependence from one another and from the shape of the plastic article that pressure of the plastic mass upon the web material is minimized.

10. The method of claim 1, wherein the mold halves execute opening and closing movements of the injection mold in a horizontal direction.

11. The method of claim 4, wherein the web material is heated to a temperature of below 200° C.

12. The method of claim 11, wherein the web material is heated to a temperature in the range of 40 to 60° C.

13. A method of producing a plastic article, comprising the steps of:
   a) placing a thermally insulated web material, having a front side and a back side, between confronting mold halves of an injection mold;
   b) moving the web material by one of the mold halves towards the other one of the mold halves, thereby pre-forming the web material between confronting inner wall surfaces of the mold halves;
   c) holding the web material with the front side against the inner wall surface of the other mold half;
   d) introducing a plastic mass to the back side of the web material and simultaneously moving the one mold half away from the other mold half to a predetermined position to maintain a fixed gap between the confronting mold halves of the injection mold for migration of the plastic mass and adhesion of the plastic mass to the back side of the web material; and
   e) and further comprising the step of moving the one mold half toward the other mold half to thereby fully close the injection mold to form a finished plastic article.

14. The method of claim 13, wherein the holding step includes applying a pressure on the back side of the web material.

15. The method of claim 13, wherein the holding step includes applying a negative pressure on the front side of the web material.

16. The method of claim 13, wherein the holding step includes forcing marginal areas of the web material from the back side against the other mold half.

17. The method of claim 13, wherein plastic mass is introduced into the gap when the on mold half moves toward the other mold half to fully close the injection mold.

18. The method of claim 13, and further comprising the step of heating at least predetermined areas of the web material before or after step a).

19. The method of claim 18, wherein the web material is heated to a temperature of below 200° C.

20. The method of claim 19, wherein the web material is heated to a temperature in the range of 40 to 60° C.

* * * * *